(12) United States Patent
Burroughs

(10) Patent No.: US 7,421,277 B2
(45) Date of Patent: Sep. 2, 2008

(54) METHOD AND APPARATUS FOR PERFORMING POSITION DETERMINATION WITH A SHORT CIRCUIT CALL FLOW

(75) Inventor: Kirk Allan Burroughs, Alamo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 10/561,801

(22) PCT Filed: Feb. 4, 2005

(86) PCT No.: PCT/US2005/003563

§ 371 (c)(1),
(2), (4) Date: Jul. 14, 2006

(87) PCT Pub. No.: WO2005/079002

PCT Pub. Date: Aug. 25, 2005

(65) Prior Publication Data

US 2006/0276167 A1    Dec. 7, 2006

Related U.S. Application Data

(60) Provisional application No. 60/542,496, filed on Feb. 5, 2004.

(51) Int. Cl.
*H04Q 7/20* (2006.01)
(52) U.S. Cl. .................. 455/456.2; 455/456.1

(58) Field of Classification Search .............. 455/456.2, 455/456.1, 567
See application file for complete search history.

(56) References Cited

U.S. PATENT DOCUMENTS

| 6,718,177 | B1* | 4/2004 | Comer et al. ............... 455/458 |
| 6,975,941 | B1* | 12/2005 | Lau et al. .................... 701/213 |
| 2005/0148340 | A1* | 7/2005 | Guyot ..................... 455/456.2 |

* cited by examiner

*Primary Examiner*—Creighton H Smith
(74) *Attorney, Agent, or Firm*—Bruce W. Greenhaus; Andrea L. Mays; Thomas R. Rouse

(57) ABSTRACT

For a call flow to perform position determination, a network (100) sends to a user equipment (UE) (120) an indication (e.g., a request for permission) to perform a position fix for the UE (120). The UE (120) responds by sending to the network an acknowledgment (e.g., a grant of permission) to perform the position fix. The UE (120) selectively sends a position estimate for itself to the network (100), typically along with the acknowledgment. The network (100) may initiate location processing if (1) a position estimate is not received from the UE (120) or (2) a position estimate is received from the UE (120) but the network (100) decides not to use this position estimate. In this case, the network (100) and the UE (120) perform location processing to obtain a position fix for the UE (120). However, if a position estimate is received from the UE (120) and the network (100) decides to use the position estimate, then the location processing is bypassed or short circuited.

41 Claims, 9 Drawing Sheets

METHOD AND APPARATUS FOR PERFORMING POSITION DETERMINATION WITH A SHORT CIRCUIT CALL FLOW

This application claims priority from provisional U.S. patent application Ser. No. 60/542,496, entitled Pre-Supl llp Protocol Specification, filed Feb. 5, 2004.

BACKGROUND

I. Field

The present invention relates generally to communication, and more specifically to a method and apparatus for performing position determination.

II. Background

It is often desirable, and sometimes necessary, to know the position of a wireless device in a network. For example, a wireless user may utilize the wireless device to browse through a website and may click on location sensitive content. The web server would then query the network for the position of the wireless device. The network would initiate location processing with the wireless device in order to perform a position fix and ascertain the position of the wireless device. The network would then return a position estimate for the wireless device to the web server, which uses this position estimate to provide appropriate content to the wireless user. There are many other scenarios in which location information is useful or necessary. In the following description, the terms "location" and "position" are synonymous and are used interchangeably.

The network typically implements a specific call flow (or procedure) for network-initiated position determination. For the call flow, the network may send a message to ask the wireless user for permission to perform the position fix. The wireless user may respond by either granting or denying the request. If the request is granted, then the network and the wireless device perform location processing to obtain a position fix for the wireless device. This location processing may entail (1) invoking a network entity (e.g., a positioning server) designated to handle position determination for the wireless device and (2) exchanging messages between this network entity and the wireless device to perform a position fix for the wireless device.

The call flow for the network-initiated position determination is typically performed in its entirety each time the position of the wireless device is queried. For example, if the wireless user clicks on different location sensitive contents, then the position of the wireless device may be queried and the location processing may be performed each time that the location sensitive content is clicked. This may result in inefficient use of system resources.

There is therefore a need in the art for a method and apparatus for efficiently performing position determination.

SUMMARY

A method and apparatus for efficiently performing position determination for a wireless device, which is also called a user equipment (UE), is described herein. In one embodiment of the method and apparatus, a network sends to the UE an indication (e.g., a request for permission) to perform a position fix for the UE. The network may send this indication in response to receiving a request from a client entity for the position of the UE. The UE responds by sending to the network an acknowledgment (e.g., a grant of permission) to perform the position fix. The UE selectively (or optionally) sends to the network a position estimate for itself, typically along with the acknowledgment, if this position estimate is available and even if the network did not request for the position estimate. The network may initiate location processing if (1) a position estimate is not received from the UE or (2) a position estimate is received from the UE but the network decides not to use this position estimate. In this case, the network and the UE perform location processing to obtain a position fix for the UE. The location processing includes appropriate signaling exchanges and processing to obtain location information for the target UE. However, if a position estimate is received from the UE and the network decides to use the position estimate, then the location processing is bypassed or short circuited. This short circuit saves system resources and results in a faster response to the request for the position of the UE, both of which are highly desirable.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
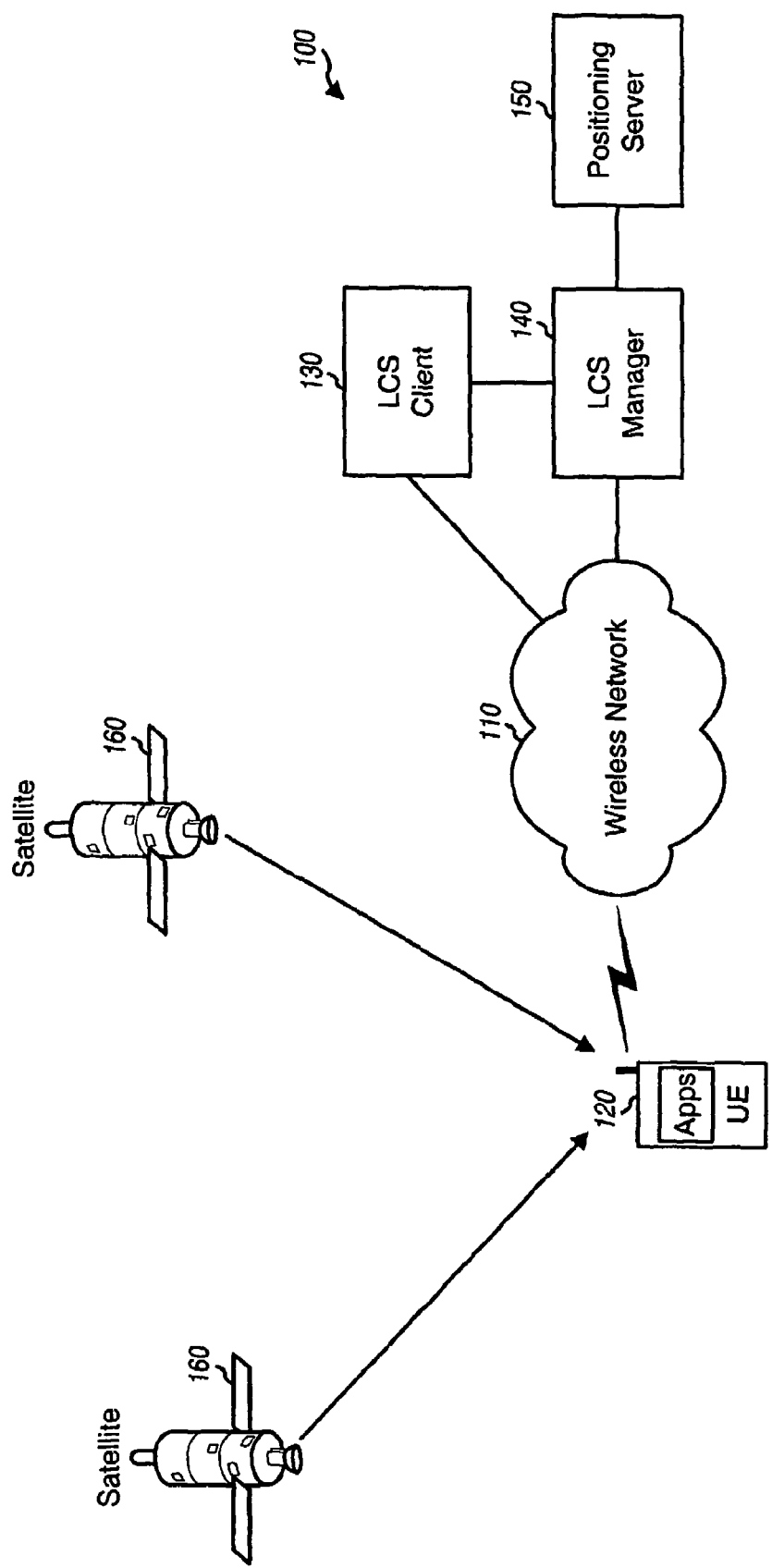
FIG. 1 shows a diagram of a network capable of performing position determination.

FIG. 1 shows a diagram of a network 100 that can efficiently perform position determination. Network 100 includes a wireless network 110 that provides wireless communication for wireless devices located throughout the coverage area of the wireless network. For simplicity, only one wireless device 120 is shown in FIG. 1. A wireless device may be fixed or mobile and may also be called a user equipment (UE), a mobile station, a terminal, a subscriber unit, or some other terminology.

Wireless network 110 may be a Code Division Multiple Access (CDMA) network, a Time Division Multiple Access (TDMA) network, a Frequency Division Multiple Access (FDMA) network, an Orthogonal Frequency Division Multiple Access (OFDMA) network, or some other multiple access network. A CDMA network may implement one or more CDMA radio access technologies (RATs) such as Wideband-CDMA (W-CDMA) and cdma2000. cdma2000 covers IS-2000, IS-856, and IS-95 standards. A TDMA network may implement one or more TDMA RATs such as Global System for Mobile Communications (GSM). These various RATs and standards are well known in the art. W-CDMA and GSM are described in documents from a consortium named "3rd Generation Partnership Project" (3GPP) and are parts of Universal Mobile Telecommunication System (UMTS). cdma2000 is described in documents from a consortium named "3rd Generation Partnership Project 2" (3GPP2). 3GPP and 3GPP2 documents are publicly available. For clarity, certain aspects are specifically described below for UMTS. Wireless device 120 is called UE 120 (3GPP terminology) in the following description.

In network 100, a location services (LCS) client 130 is a function or an entity that requests location information for LCS targets. An LCS target is a UE whose position is being sought. In general, an LCS client may reside in a network entity or a UE. An LCS manager 140 communicates with wireless network 110, LCS client 130, and a positioning server 150. LCS manager 140 provides various services such as subscriber privacy, authorization, authentication, billing, and so on. Positioning server 150 provides position determination services and supports UE-based and UE-assisted positioning modes. In the UE-based positioning mode, the position of a UE is determined by the UE, possibly with assistance data from positioning server 150. In the UE-assisted positioning mode, the position of a UE is determined by positioning server 150 with assistance (e.g., measurements) from the UE.

For simplicity, FIG. 1 mainly shows network entities that are pertinent for position determination. These network entities may also be referred to by other names. For example, LCS manager 140 may also be called an LCS server, a location server, a mobile positioning center (MPC), a gateway mobile location center (GMLC), and so on. Positioning server 150 may also be called a position determination entity (PDE), a serving mobile location center (SMLC), and so on. In general, a network may include any collection of network entities that can provide any range of services.

FIG. 1 shows a specific architecture for network 100. In this architecture, UE 120 and positioning server 150 exchange messages via LCS manager 140, which acts as a proxy for these two entities. Positioning server 150 may communicate with LCS manager 140 using one interface (e.g., an LIp interface) and may communicate with UE 120 via LCS manager 140 using another interface (e.g., an Lup interface). Other architectures with other interfaces between the various network entities may also be used for network 100.

Network 100 may utilize a user plane or a control plane to support position determination. A user plane is a mechanism for carrying data for higher-layer applications and employs a user-plane bearer, which is typically implemented with various protocols such as User Datagram Protocol (UDP), Transmission Control Protocol (TCP), and Internet Protocol (IP), all of which are well known in the art. A control plane (which is also commonly called a signaling plane) is another mechanism for carrying data for higher-layer applications and may be implemented with network-specific protocols and signaling messages.

UE 120 may also receive signal from various satellites, such as satellites 160 in a Global Positioning System (GPS). GPS is a constellation of 24 active and some spare satellites that circle the earth in well-spaced orbits. UE 120 may measure signals from GPS satellites and obtain pseudo-range measurements for these satellites. These measurements may be used to compute a precise position estimate for the UE.

The position of UE 120 may be requested by (1) applications (Apps) running at the UE, which results in UE-initiated position determination, and (2) applications running at LCS client 130, which results in network-initiated position determination. In general, network-initiated and UE-initiated position determination may be triggered by various entities, applications, and events. For clarity, some exemplary call flows for network-initiated and UE-initiated position determination are described below.

Figure 2A:
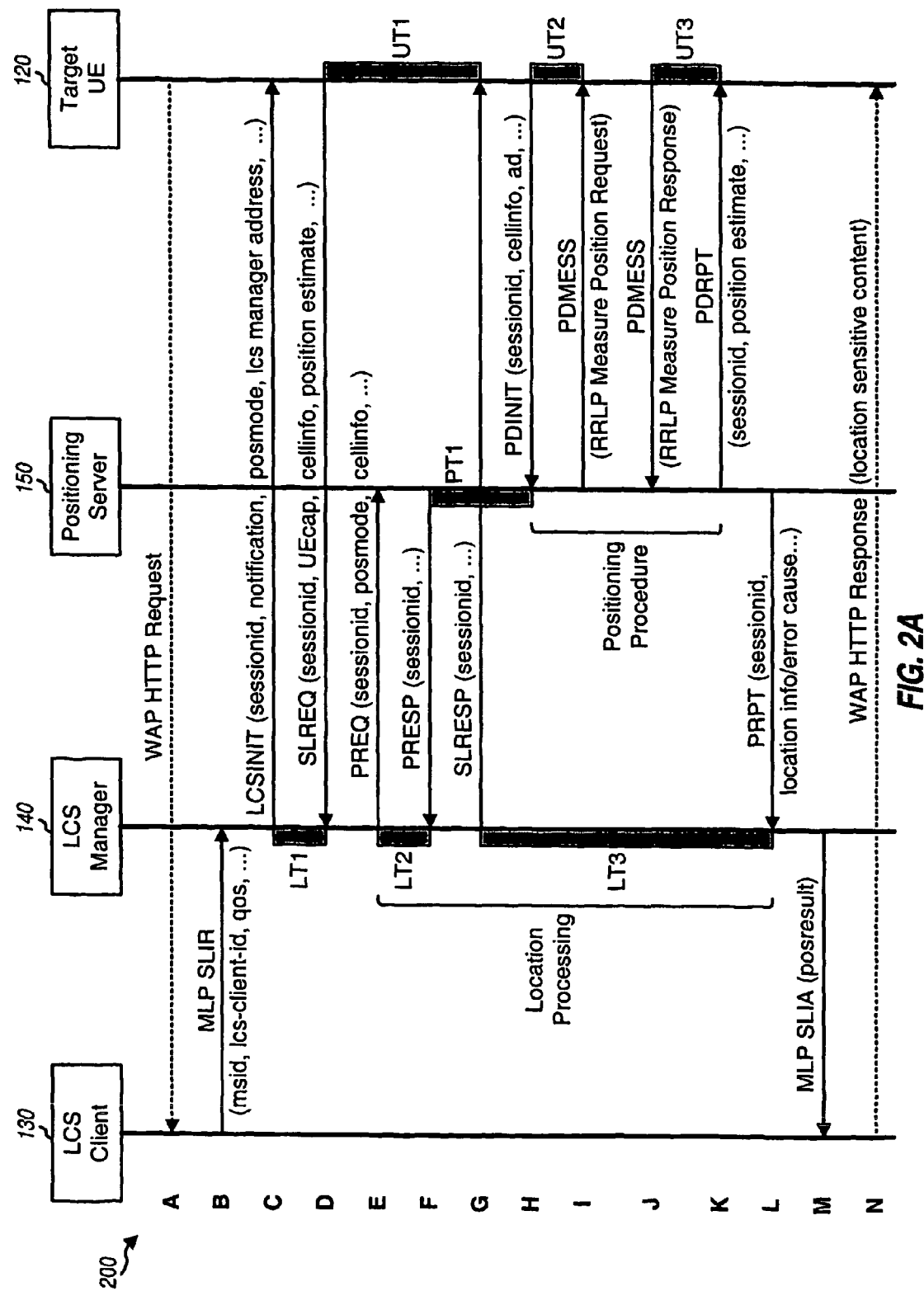
FIG. 2A shows a call flow for network-initiated position determination in a network with a user plane.

FIG. 2A shows an exemplary call flow 200 for network-initiated position determination in network 100 with a user plane. For call flow 200, UE 120 is a target UE whose position is being sought. Positioning server 150 serves the geographic area associated with the target UE 120.

A wireless user at UE 120 executes a Wireless Application Protocol (WAP) application (or some other browser application), browses a website, and requests location sensitive content by sending a WAP Hyper Text Transfer Protocol (HTTP) Request to LCS client 130 via wireless network 110 (step A). Step A may or may not be present for network-initiated position determination. In general, position determination may be initiated on the network side by various entities and/or in response to various events.

LCS client 130 receives the WAP HTTP Request and determines that the position of UE 120 is needed in order to provide the appropriate content. LCS client 130 then sends a Mobile Location Protocol (MLP) Location Immediate Request (SLIR) message to LCS manager 140 to request for an immediate position fix for UE 120 (step B). MLP is one signaling protocol that may be used for the communication between LCS client 130 and LCS manager 140, and other signaling protocols may also be used for this interface. An immediate position fix is a position fix that is obtained as soon as possible and in response to a request. In contrast, a periodic position fix is a position fix that is obtained periodically, e.g., based on a predetermined schedule. The MLP SLIR message may contain, for example, an identifier for UE 120 (msid), an identifier for LCS client 130 (lcs-client-id), a location quality of service (qos), and so on. The qos indicates the required accuracy for the position fix for the target UE.

LCS manager 140 receives the MLP SLIR message, authenticates LCS client 130 based on the lcs-client-id, and determines if LCS client 130 is authorized for the requested service (also step B). LCS manager 140 may perform a subscriber privacy check to determine whether a position fix is permitted for the UE (also step B). This check may be performed based on (1) the lcs-client-id, msid, qos, and so on, included in the received MLP SLIR message and (2) a profile or a subscription for a subscriber, which is typically the wireless user at the UE. A wireless user or subscriber typically needs to be provisioned in order to obtain communication and location services, and the information for the subscriber is typically stored in a profile or subscription. If the subscriber privacy check passes, then the remaining steps for call flow 200 continue as described below. Otherwise, if the subscriber privacy check fails, then LCS manager 140 does not authorize LCS client 130 for the requested service, call flow 200 terminates early and jumps to step M, and LCS manager 140 returns an applicable MLP return code.

If all of the applicable checks pass in step B, then LCS manager 140 initiates location processing with UE 120 by sending an LCSINIT message to the UE (step C). The LCSINIT message may contain, for example, a session identifier (sessionid), a notification, a positioning mode (pos-mode), an address for LCS manager 140 (lcs manager address), and so on. The session identifier is used to unambiguously identify the communication between the network and the UE for the location request. The notification is a two-part parameter that indicates (1) whether to perform notification to inform the wireless user of the location request and (2) whether to perform verification to obtain consent from the wireless user for the location request. The notification parameter typically includes some pertinent text for notification. The positioning mode indicates which mode to use for position determination, e.g., UE-based or UE-assisted positioning mode. The LCSINIT message is implemented as a WAP PUSH trigger to start the location processing. LCS manager 140 starts a timer LT1 upon sending the LCSINIT message (also step C). The LT1 timer is used to timeout the location processing if a response is not received from UE 120 prior to expiration of the timer.

UE 120 receives the LCSINIT message from LCS manager 140. If notification or verification is required, as indicated by the notification parameter in the LCSINIT message, then UE 120 provides popup text or some other display to notify the wireless user of the entity requesting location information for the UE. The popup text may be generated based on the lcs-client-id and text included in the received LCSINIT message. If verification is required, then the wireless user is queried to either grant or deny the location request.

If the wireless user grants the location request, then UE 120 prepares for location processing by retrieving various types of information that are pertinent for position determination such as, for example, the current cell information (cellinfo) and the UE capabilities (UEcap). The cell information may be used to provide appropriate assistance data for the UE. The UE capabilities may be used to determine which positioning mode to use to perform a position fix for the UE. UE 120 then sends a Start Location Request (SLREQ) message to LCS manager 140 to initiate a location session with the LCS manager (step D). This SLREQ message may contain, for example, the sessionid, cell information, selected positioning mode, UE capabilities, and so on.

If the wireless user denies the location request, then UE 120 sends a Start Location Reject (SLREJ) message to LCS manager 140 (not shown in FIG. 2A). The SLREJ message may contain a denial indication and/or other parameters. The SLREJ message ends the communication between UE 120 and LCS manager 140 for this location request. The description below assumes that UE 120 sends an SLREQ message.

The LCSINIT message essentially asks UE 120 for permission to perform a position fix for the UE and wakes up the UE for location processing. UE 120 normally responds by returning (1) either a grant or a denial of the location request and (2) if the location request is granted, pertinent information used to perform the position fix for the UE. For network-initiated position determination, LCS manager 140 does not expect UE 120 to have location information for itself. Conventionally, location processing is performed for each granted location request.

In many instances, UE 120 may already have a position estimate for itself. This position estimate may be a cached position estimate that was obtained, for example, by performing a position fix for a prior location request, which may have been initiated by the network or the UE. This cached position estimate may have been obtained using either the UE-based or UE-assisted positioning mode and may be an accurate or a coarse estimate. UE 120 may also be able to derive a new position estimate for itself using the UE-based positioning mode. The available position estimate at UE 120 may thus be a cached position estimate or a new position estimate.

In an embodiment, UE 120 selectively (or optionally) includes its position estimate in the SLREQ message sent to LCS manager 140 if this position estimate is available. For this embodiment, UE 120 has the discretion to include or omit the position estimate. In another embodiment, UE 120 may include its position estimate in the SLREQ message only if certain criteria imposed by the network and/or the UE are satisfied. For example, UE 120 may include its position estimate only if (1) an immediate position fix is being requested, (2) the UE is allowed to use the UE-based positioning mode, and (3) the position estimate can be obtained without any interaction with the network. Other criteria or combinations of criteria may also be imposed. In any case, subject to satisfaction of all required criteria, if any, UE 120 may include its position estimate in the SLREQ message even if LCS manager 140 did not request for this position estimate. UE 120 starts a timer UT1 upon sending the SLREQ message (also step D). This timer is used to timeout the location processing if a response is not received from LCS manager 140 prior to expiration of the timer.

LCS manager 140 receives the SLREQ message from UE 120 and stops the LT1 timer upon receiving this message (also step D). LCS manager 140 extracts the parameters included in the received SLREQ message. If the position estimate for UE 120 is included in the SLREQ message, then LCS manager 140 may or may not use this position estimate. LCS manager 140 may make this determination based on various factors such as, for example, the accuracy (or uncertainty) of the position estimate, the qos required by LCS client 130, the age of the location information, the subscriber profile, and so on. If LCS manager 140 decides to use the position estimate provided by UE 120, then call flow 200 performs step G and then proceeds to step M, as described below.

LCS manager 140 initiates location processing for UE 120 if (1) a position estimate is not included in the SLREQ message sent by the UE or (2) a position estimate is included in the SLREQ message but the LCS manager decides not to use this position estimate. LCS manager 140 initiates the location processing by sending a Position Request (PREQ) message to positioning server 150 (step E). This PREQ message may contain, for example, the sessionid, the posmode, the cellinfo, and so on. LCS manager 140 starts a timer LT2 upon sending the PREQ message (also step E). The LT2 timer is used to timeout the communication with positioning server 150 if a response is not received from the positioning server prior to expiration of the timer.

Positioning server 150 receives the PREQ message from LCS manager 140 and sends back a Position Response (PRESP) message (step F). The PRESP message may contain, for example, the sessionid. The PRESP message confirms to LCS manager 140 that positioning server 150 is ready to process the location request identified by the sessionid. Positioning server 150 starts a timer PT1 upon sending the PRESP message (also step F). The PT1 timer is used to timeout the position determination for this sessionid if a message is not received from target UE 120 prior to expiration of the timer.

LCS manager 140 receives the PRESP message from positioning server 150 and stops the LT2 timer (also step F). LCS manager 140 then sends a Start Location Response (SL-RESP) message to UE 120 to initiate a positioning procedure (step G). The positioning procedure includes appropriate signaling exchanges and pertinent processing to obtain a position estimate for the target UE. The SLRESP message may contain, for example, the sessionid and possibly other information. The SLRESP message informs UE 120 that positioning server 150 is ready to perform a position fix for the UE. LCS manager 140 starts a timer LT3 upon sending the SLRESP message (also step G). The LT3 timer is used to timeout the communication with positioning server 150 if a response is not received from the positioning server prior to expiration of this timer.

UE 120 receives the SLRESP message from LCS manager 140 and stops the UT1 timer (also step G). UE 120 then starts the positioning procedure by sending a Position Determination Initiation (PDINIT) message to LCS manager 140, which forwards the message to positioning server 150 (step H). This PDINIT message may contain, for example, the sessionid, the cellinfo (e.g., the identifier of the cell in which UE 120 is located), request for assistance data (ad), a coarse position estimate for the UE, and so on. UE 120 starts a timer UT2 upon sending the PDINIT message (also step H). The UT2 timer is used to timeout the communication with positioning server 150 if a response is not received from the positioning server prior to expiration of this timer.

Positioning server 150 receives the PDINIT message from UE 120 and stops the PT1 timer (also step H). Positioning server 150 may then start a precise position determination procedure by sending a Position Determination Messaging (PDMESS) message that contains a Radio Resource LCS Protocol (RRLP) Measure Position Request message (step I). RRLP is one of multiple assisted Global Positioning System (A-GPS) protocols that are available to perform a position fix with measurements for GPS satellites. The RRLP Measure Position Request message may contain, for example, a request for a position fix, assistance data, and so on.

UE 120 receives the PDMESS message from positioning server 150 and stops the UT2 timer (also step I). UE 120 then performs measurements appropriate for the selected positioning mode. For example, UE 120 may obtain (1) pseudo-range and/or time measurements for GPS satellites for an A-GPS position fix, (2) pseudo-range and/or time measurements for base stations for a terrestrial position fix, (3) measurements for both satellites and base stations for a hybrid position fix, (4) cell identifiers for a cell-ID based position fix, and so on. For the UE-based positioning mode, UE 120 further computes a position estimate based on the measurements. UE 120 then sends a PDMESS message that contains an RRLP Measure Position Response message to LCS manager 140, which forwards the message to positioning server 150 (step J). The RRLP Measure Position Response message may contain the measurements made by the UE, a position estimate for the UE, and/or request for more assistance data. For the UE-assisted positioning mode, UE 120 starts a timer UT3 upon sending the PDMESS message (also step J). The UT3 timer is used to timeout the communication with positioning server 150 if a response is not received from the positioning server prior to expiration of this timer.

Positioning server 150 receives the PDMESS message from UE 120 (also step J). For the UE-based positioning mode, positioning server 150 uses the position estimate included in the received RRLP Measure Position Response message. For the UE-assisted positioning mode, positioning server 150 computes a position estimate for UE 120 based on the measurements included in the received message. For the UE-assisted positioning mode, positioning server 150 completes the positioning procedure by sending a Position Determination Report (PDRPT) message to UE 120 (step K). Positioning server 150 does not send a PDRPT message to UE 120 for the UE-based positioning mode. Positioning server 150 also sends a Position Report (PRPT) message to LCS manager 140 (step L). This PRPT message may contain, for example, the sessionid, location information for UE 120, an error code (if applicable), and so on.

LCS manager 140 receives the PRPT message from positioning server 150 and stops the LT3 timer (also step L). LCS manager 140 extracts the location information for UE 120 from the received PRPT message and sends an MLP Location Immediate Acknowledgment (SLIA) message to LCS client 130 (step M). This MLP SLIA message contains the requested position estimate for UE 120 (posresult) and possibly other pertinent information. LCS client 130 receives the MLP SLIA message and uses the position estimate for UE 120 to retrieve the location sensitive content requested by the wireless user. LCS client 130 then sends to UE 120 a WAP HTTP Response message containing this location sensitive content (step N). Steps A and N are present for a WAP call (e.g., to download location sensitive content) and may not be present for other instances of network-initiated position determination.

Figure 2B:
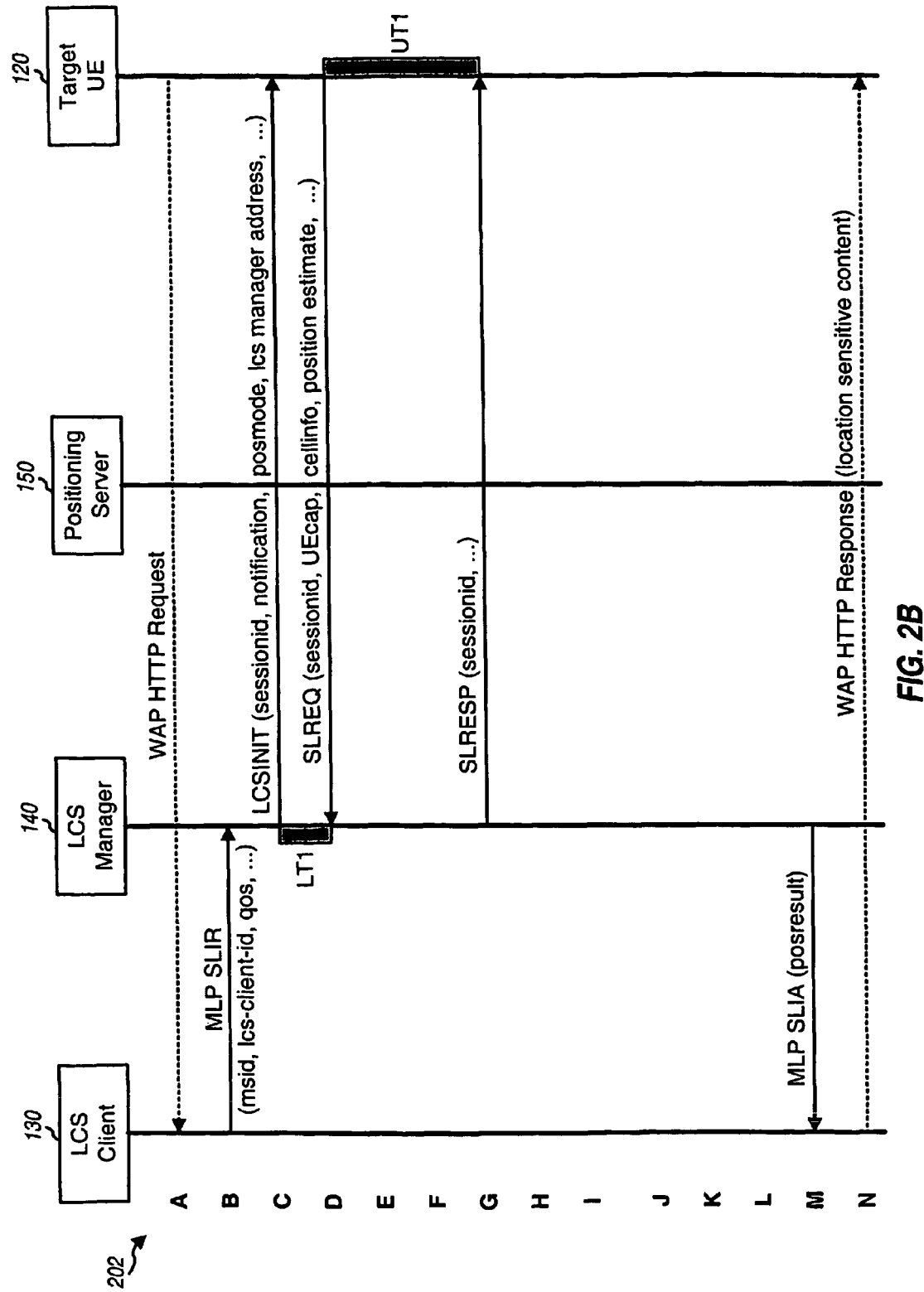
FIG. 2B shows the call flow in FIG. 2A with a short circuit for the location processing.

FIG. 2B shows a call flow 202 for network-initiated position determination with a short circuit for the location processing. Call flow 202 includes a subset of the steps in call flow 200 shown in FIG. 2A. Steps A through D in call flow 202 are the same as steps A through D in call flow 200. In step D, UE 120 sends an SLREQ message that contains a position estimate for the UE. LCS manager 140 receives the SLREQ message, decides to use the position estimate provided by the UE, and skips steps E and F. LCS manager 140 sends an SLRESP message to direct UE 120 not to initiate the positioning procedure (step G). Call flow 202 bypasses or short circuits the location processing in steps E and F and steps H through L. LCS manager 140 then sends to LCS client 130 an MLP SLIA message containing the position estimate provided by UE 120 (step M). As shown in FIG. 2B, system resources may be conserved and a faster response for the location request may be achieved by allowing UE 120 to include its position estimate in the SLREQ message.

Figure 3A:
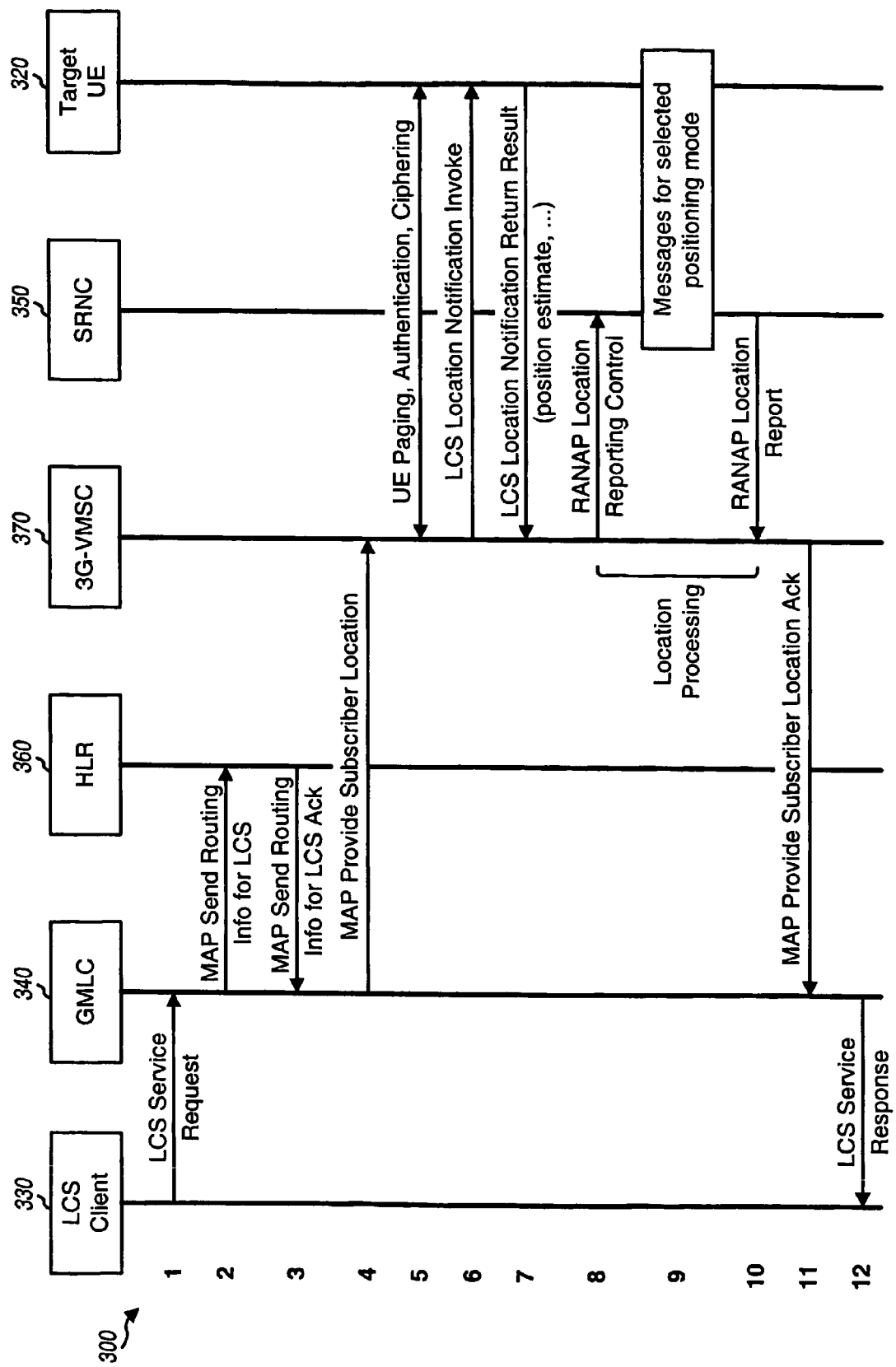
FIG. 3A shows a call flow for network-initiated position determination in a network with a control plane.

FIG. 3A shows another exemplary call flow 300 for network-initiated position determination in a UMTS or GSM network with a control plane. Network-initiated position determination is called Mobile Terminating Location Request (MT-LR) in UMTS/GSM. The UMTS/GSM network includes an LCS client 330 that is similar to LCS client 130 in network 100, a GMLC 340 that performs the functions of LCS manager 140, a serving radio network controller (SRNC) 350 that performs the functions of positioning server 150, a target UE 320 that is similar to UE 120, a home location register (HLR) 360 that stores registration information for UEs (including UE 320) that have registered with the wireless network covered by the HLR, and a third generation visitor mobile services switching centre (3G-VMSC) 370 that performs switching functions (e.g., routing of circuit-switch messages and data) for UEs within its coverage area.

For call flow 300, LCS client 330 requests the current position of target UE 320 from GMLC 340 (step 1). GMLC 340 verifies the identity of LCS client 330, authenticates the LCS client, and determines whether the LCS client is authorized for the requested LCS service. If LCS client 330 is authorized, then GMLC 340 derives an identifier of target UE 320 and determines the LCS QoS from either subscription data for the subscriber of UE 320 or data supplied by LCS client 330. The UE identifier may be a Mobile Subscriber ISDN (MSISDN), which is a dialable number, or an International Mobile Subscriber Identity (IMSI), which is a non-dialable number. GMLC 340 then sends to HLR 360 a Mobile Application Part (MAP) Send Routing Info for LCS message that contains the identifier of UE 320 (step 2).

HLR 360 verifies that GMLC 340 is authorized to request location information for UE 320. HLR 360 then returns to GMLC 340 a MAP Send Routing Info for LCS Ack message that contains the address of 3G-VMSC 370 and the identifier of UE 320 (step 3). If GMLC 340 already knows both the 3G-VMSC address and the UE identifier (e.g. from a previous location request), then steps 2 and 3 may be skipped.

GMLC 340 then sends a MAP Provide Subscriber Location message to 3G-VMSC 370 using the address provided by HLR 360 (step 4). This message contains the type of location information requested (e.g., the current position), the UE identifier, the LCS QoS (e.g., required accuracy and response time), an indication of whether LCS client 330 has override capability, and possibly other information.

3G-VMSC 370 may authenticate GMLC 340 and verify that the location request is allowed (also step 4). If the location request is allowed, then 3G-VMSC 370 may invoke the wireless network to perform paging, authentication and ciphering of UE 320 (step 5). UE 320 may provide its capabilities, e.g., the UE-based and/or UE-assisted positioning modes supported by the UE (also step 5).

3G-VMSC 370 may send an LCS Location Notification Invoke message to UE 320 (step 6). This message indicates the type of location request (e.g., the current position), the identity of LCS client 330, and whether privacy verification is required (step 6). UE 320 notifies the wireless user of the location request. If privacy verification was requested, then UE 320 queries the wireless user regarding the location request and waits for the user to grant or deny permission. UE 320 then sends an LCS Location Notification Return Result message to 3G-VMSC 370 (step 7). This message indicates whether permission is granted or denied and optionally includes a position estimate for UE 320. UE 320 may provide its position estimate, if available, even if 3G-VMSC 370 did not request for this information. The position estimate may be used to short circuit the subsequent location processing, as described below.

3G-VMSC 370 sends a Radio Access Network Application Part (RANAP) Reporting Control message to SRNC 350 (step 8). This message contains the type of location information requested, the UE capabilities, and the LCS QoS. SRNC 350 selects an appropriate positioning mode to use based on the location request, the required accuracy, and the UE capabilities. SRNC 350 then initiates an appropriate message sequence for the selected positioning mode (step 9). For example, the message sequence may include steps H through K in FIG. 2A for an A-GPS positioning procedure. UE 320 performs the required measurements and reports either the measurements obtained by the UE or a position estimate computed by the UE based on the measurements. SRNC 350 receives the report from UE 320 and, for the UE-assisted positioning mode, computes a position estimate for the UE based on the received measurements. SRNC 350 then sends to 3G-VMSC 370 an RANAP Location Report message that contains the position estimate for UE 320 (step 10).

3G-VMSC 370 then sends to GMLC 340 a MAP Provide Subscriber Location Ack message that contains the position estimate for UE 320 and possibly other pertinent information (step 11). GMLC 340 then sends to LCS client 330 an LCS Service Response message that contains the position estimate for UE 320 (step 12).

Most of call flow 300 is described in documents 3GPP TS 23.171 version 3.11 (March 2004) and 3GPP TS 23.271 version 6.10 (December 2004), both of which are publicly available. However, these versions of the 3GPP standards do not allow the target UE to provide its position estimate in step 7. These versions of the 3GPP standards require the entire call flow 300 to be performed for each location request, even if the target UE already has a suitable position estimate.

Figure 3B:
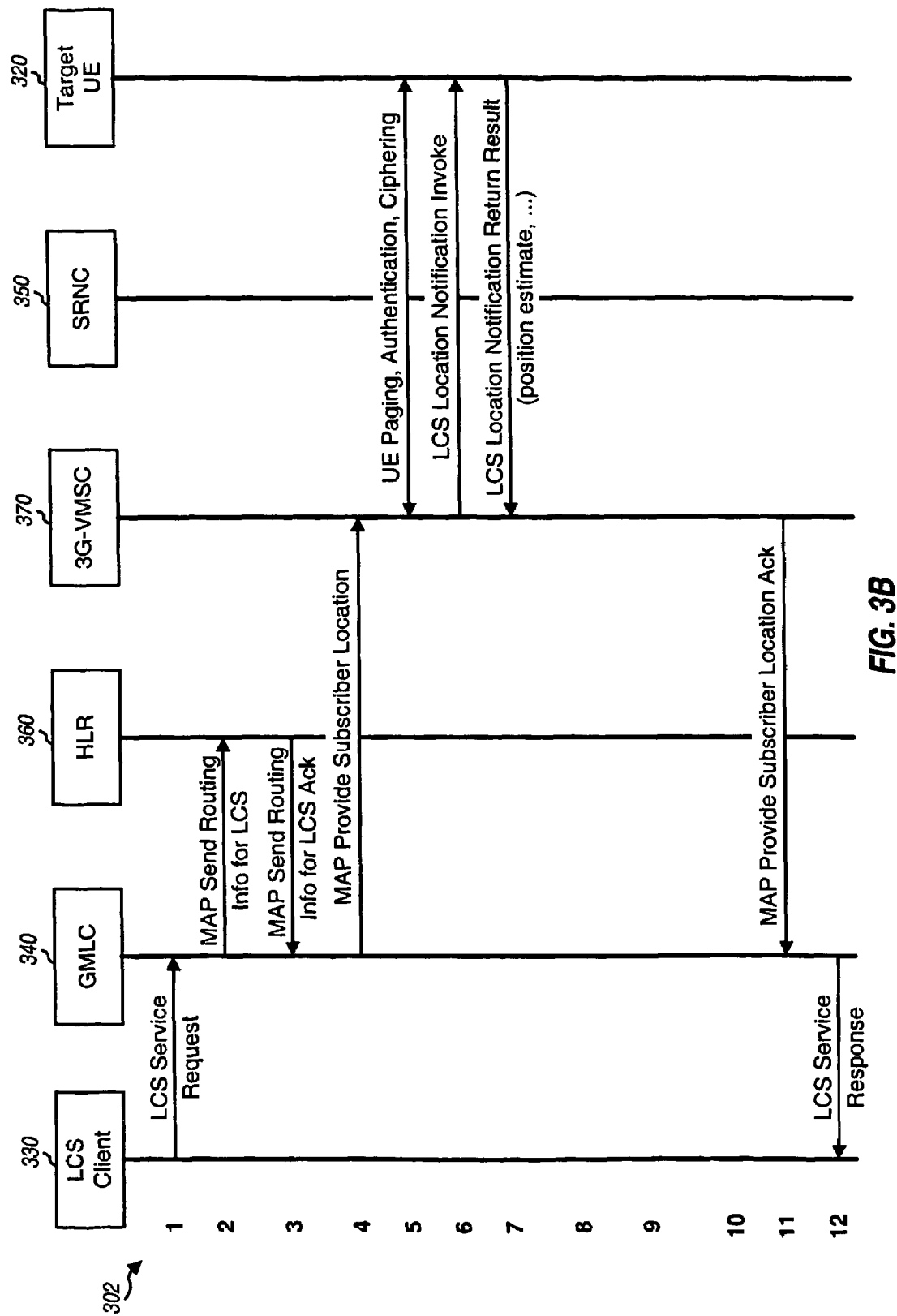
FIG. 3B shows the call flow in FIG. 3A with a short circuit for the location processing.

FIG. 3B shows another call flow 302 for network-initiated position determination with a short circuit for the location processing. Call flow 302 includes a subset of the steps in call flow 300 shown in FIG. 3A. Steps 1 through 7 in call flow 302 are the same as steps 1 through 7 in call flow 300. In step 7, UE 320 sends an LCS Location Notification Return Result message that contains a position estimate for the UE. 3G-VMSC 370 receives this message and decides to use the position estimate provided by UE 320. By allowing the target UE to provide its position estimate along with the consent/verification within the notification response in step 7, the UMTS network can bypass steps 8 through 10 in call flow 300 and provide this position estimate to LCS client 330 in steps 11 and 12. This can save system resources and provide a faster response for the location request by the LCS client.

Figure 4A:
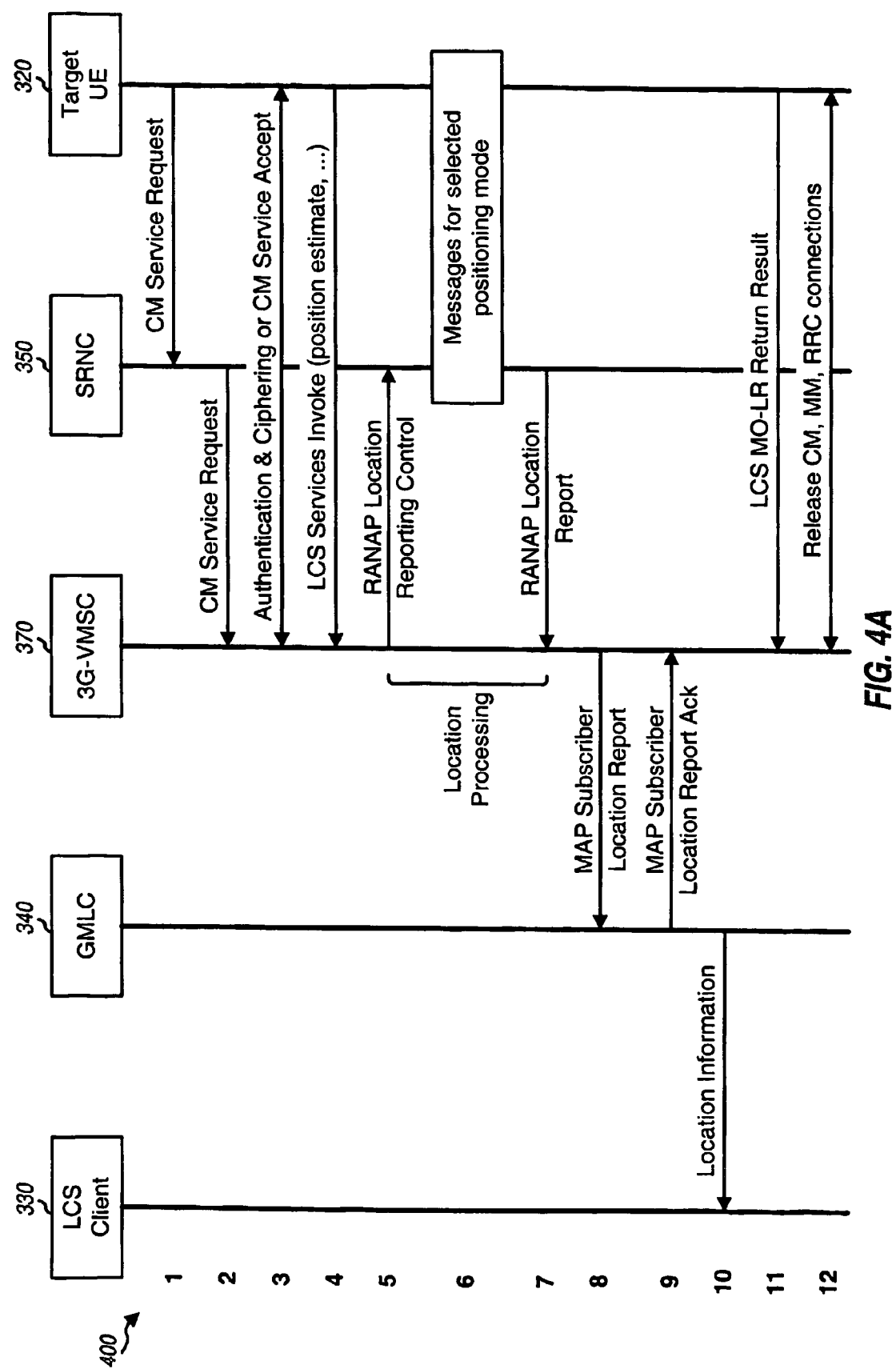
FIG. 4A shows a call flow for UE-initiated position determination in a network with a control plane.

FIG. 4A shows an exemplary call flow 400 for UE-initiated position determination in a UMTS or GSM network with a control plane. UE-initiated position determination is called Mobile Originating Location Request (MO-LR) in UMTS/GSM. The entities in FIG. 4A are described above for FIG. 3A. UE 320 may use call flow 400 to (1) request its own location for basic self location, (2) request location assistance data for autonomous self location, (3) request a transfer of its own location to another LCS client for a transfer to a third party, and (4) achieve other results.

For call flow 400, UE 320 sends to 3G-VMSC 370 via SRNC 350 a Connection Management (CM) Service Request message that indicates a request for a call independent supplementary service (steps 1 and 2). 3G-VMSC 370 instigates authentication and ciphering if UE 320 was in an idle mode or returns a Direct Transfer CM Service Accept message if UE 320 was in a dedicated mode (step 3). UE 320 may provide its capabilities, e.g., the UE-based and/or UE-assisted positioning modes supported by the UE (also step 3). UE 320 then sends to 3G-VMSC 370 an LCS MO-LR Location Services Invoke message to request a desired location service (e.g., to request the location of the UE, location assistance data, transfer of the UE location to another LCS client, and so on) (step 4). The LCS Services Invoke message contains parameters pertinent for the desired location service such as, for example, the LCS QoS (e.g., accuracy and response time), the identify of the other LCS client, the type of assistance data desired, and so on. UE 320 may also provide its position estimate, if available, in the LCS Services Invoke message. This position estimate may be used to short circuit the subsequent location processing, as described below.

3G-VMSC 370 verifies that UE 320 is authorized for the requested location service based on a subscription profile for the UE (also step 4). If the location request is authorized, then 3G-VMSC 370 sends to SRNC 350 an RANAP Reporting Control message that contains the type of location information requested, the UE capabilities, and the LCS QoS (step 5). SRNC 350 selects an appropriate positioning mode to use based on the location request, the required accuracy, and the UE capabilities. SRNC 350 then initiates an appropriate message sequence for the selected positioning mode (step 6). Step 6 in call flow 400 is analogous to step 9 in call flow 300 in FIG. 3A. SRNC 350 receives a report with measurements or a position estimate for the UE, computes a position estimate for the UE if needed, and sends to 3G-VMSC 370 an RANAP Location Report message that contains the position estimate for the UE (step 7).

If UE 320 requests a transfer of its position estimate to another LCS client 330, then 3G-VMSC 370 sends to GMLC 340 a MAP Subscriber Location Report message that contains the position estimate for the UE and possibly other pertinent information (step 8). GMLC 340 then sends a MAP Subscriber Location Report Ack message to 3G-VMSC 370 to acknowledge receipt of the position estimate (step 9).

GMLC 340 also sends the location information to LCS client 330 (step 10). Steps 8 through 10 may be omitted, or some other steps may be performed, for other types of location services requested by UE 320.

3G-VMSC 370 sends to UE 320 an LCS MO-LR Return Result message that contains a position estimate (if requested by the UE) and possibly other pertinent information (step 11). 3G-VMSC 370 may release the CM, (Mobility Management) MM, and Radio Resource Control (RRC) connections to UE 320, if the UE was previously idle (step 12).

Most of call flow 400 is also described in documents 3GPP TS 23.171 version 3.11 and 3GPP TS 23.271 version 6.10. However, these versions of the 3GPP standards do not allow the target UE to provide its position estimate in step 4.

Figure 4B:
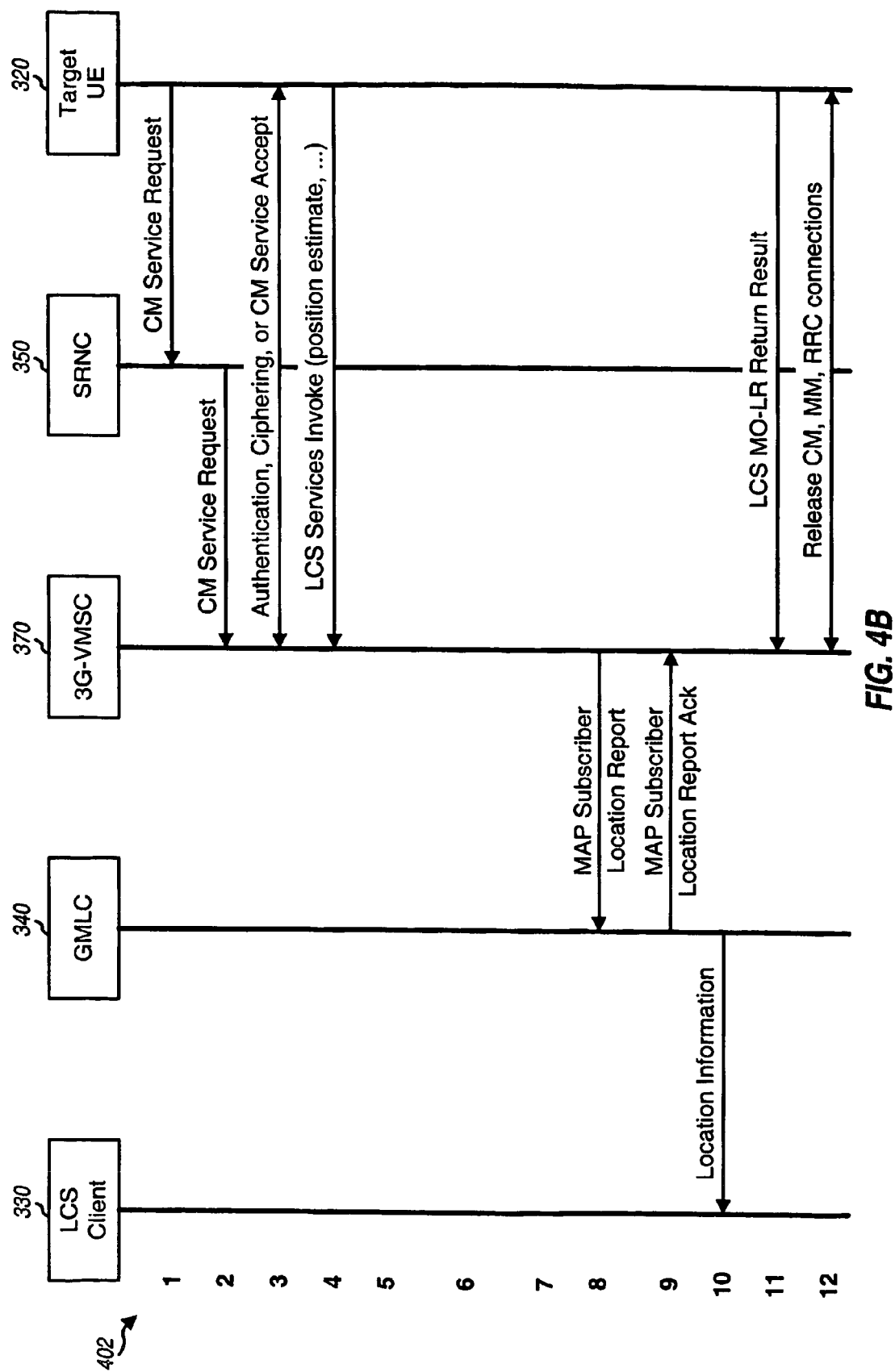
FIG. 4B shows the call flow in FIG. 4A with a short circuit for the location processing.

FIG. 4B shows a call flow 402 for UE-initiated position determination with a short circuit for the location processing. Call flow 402 includes a subset of the steps in call flow 400 shown in FIG. 4A. Steps 1 through 4 in call flow 402 are the same as steps 1 through 4 in call flow 400. In step 4, UE 320 sends an LCS Services Invoke message that contains a position estimate for the UE. 3G-VMSC 370 receives this message, decides to use the position estimate provided by UE 320, bypasses the location processing in steps 5 through 7 of call flow 400, and provides this position estimate to LCS client 330 via GMLC 340 in steps 8 through 10.

Figure 5:
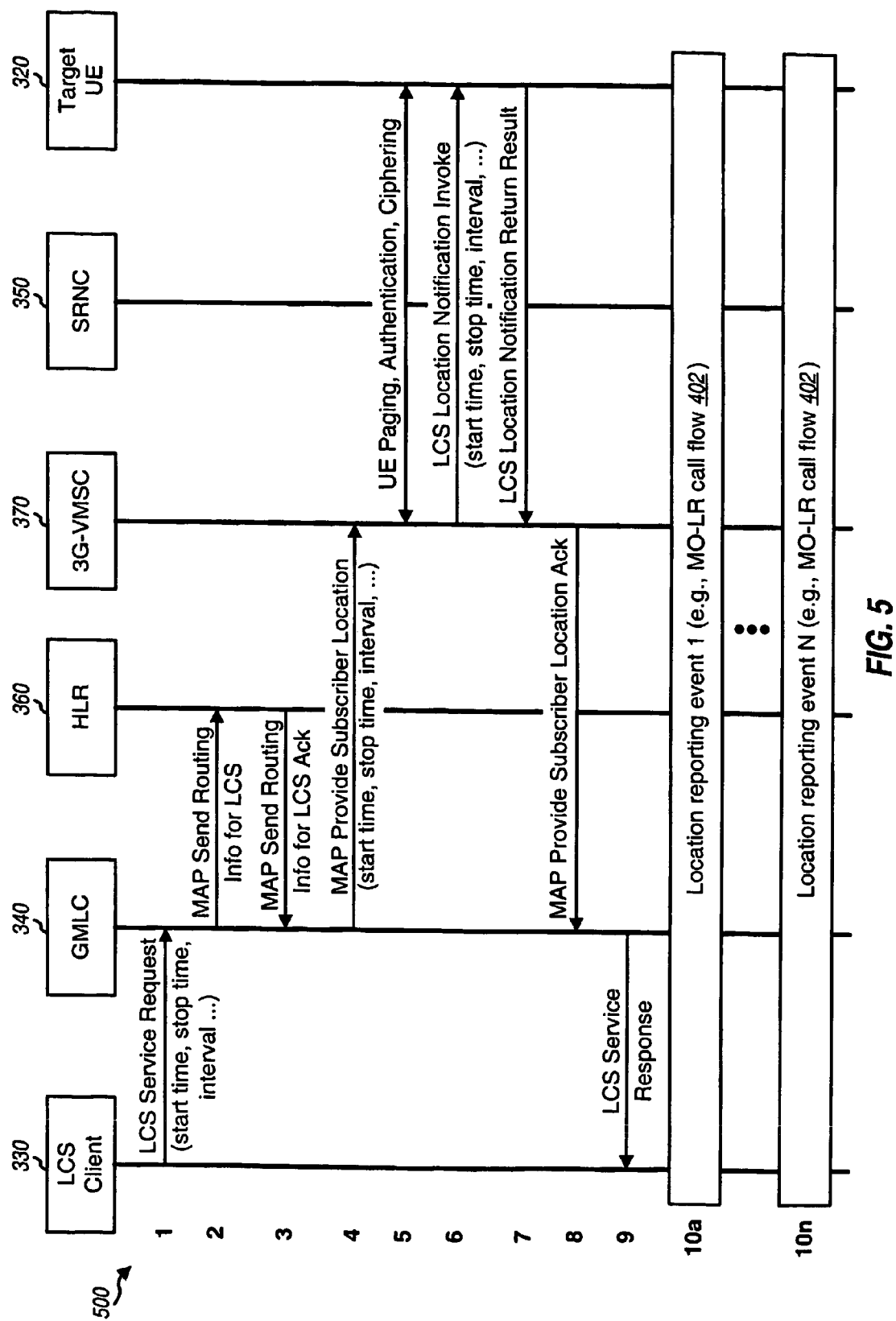
FIG. 5 shows a call flow for the network-initiated periodic location service.

FIG. 5 shows an exemplary call flow 500 for network-initiated periodic location service in UMTS/GSM. Periodic location service provides a position fix for a target UE periodically based on a schedule. For call flow 500, LCS client 330 sends to GMLC 340 an LCS Service Request message to request periodic location reporting for target UE 320 from (step 1). The LCS Service Request message contains a schedule for location reporting. The schedule may be given by, for example, (1) a start time and a stop time for the location reporting and a time interval between reporting events or position fixes, (2) a particular number of reporting events and a time interval between events, where the first reporting event can occur at the present time (now) or at a predetermined time in the future, or (3) some other format. For clarity, option (1) is used in the following description. GMLC 340 verifies, authenticates, and authorizes LCS client 330 for the requested LCS service (also step 1). If LCS client 330 is authorized, then GMLC 340 and HLR 360 exchanges signaling in steps 2 and 3, as described above for call flow 300 shown in FIG. 3A.

GMLC 340 then sends to 3G-VMSC 370 a MAP Provide Subscriber Location message that contains pertinent information such as, for example, the location information requested, the UE identifier, the LCS QoS, the start time, stop time, and interval for periodic location reporting, and so on (step 4). 3G-VMSC 370 may authenticate GMLC 340 and verify that the location request is allowed (also step 4). If the location request is allowed, then 3G-VMSC 370 may invoke the wireless network to perform paging, authentication and ciphering of UE 320 (step 5). 3G-VMSC 370 may send to UE 320 an LCS Location Notification Invoke message that contains pertinent information such as, for example, type of location request, the identity of LCS client 330, the start time, stop time, and interval for periodic location reporting, and so on (step 6). UE 320 performs notification and/or verification if required. UE 320 then sends to 3G-VMSC 370 an LCS Location Notification Return Result message that indicates whether permission is granted or denied (step 7).

3G-VMSC 370 then sends to GMLC 340 a MAP Provide Subscriber Location Ack message that acknowledges the request sent by the GMLC in step 4 (step 8). GMLC 340 then sends to LCS client 330 an LCS Service Response message that acknowledges the request sent by the LCS client in step 1 (step 9).

In one embodiment, based on the schedule sent by LCS client 330 in step 1, UE 320 periodically initiates MO-LR call flow 402 shown in FIG. 4B and provides its position estimate to the LCS client (steps 10a through 10n). Call flow 402 may be performed with much less signaling and in a shorter time than call flow 300 in FIG. 3A. UE 320 may perform MO-LR call flow 400 shown in FIG. 4A whenever needed in order to obtain updated assistance data and/or a new position estimate for itself. In another embodiment, the network periodically initiates MT-LR call flow 300 shown in FIG. 3A. For this embodiment, UE 320 can provide its position estimate (if available) in step 7 of call flow 300, and the network can short circuit the location processing if a suitable position estimate is received from the UE.

A call flow may also be defined for UE-initiated periodic location service. This call flow may include, for example, steps 1 through 4 in call flow 400 in FIG. 4A and steps 10a through 10n in call flow 500 in FIG. 5. The UE may include a schedule (e.g., for periodically reporting the position of the UE to another LCS client) in the LCS Services Invoke message sent to the network in step 4 of call flow 400.

For clarity, specific call flows with specific steps and messages have been described above in FIGS. 2A through 5. In general, a call flow for network-initiated position determination may include any number of steps, which may be different from the steps shown in FIGS. 2A through 5. Furthermore, a call flow may use any messages, which may be different from the messages shown in FIGS. 2A through 5. In general, the target UE may provide its position estimate in any message and at any time in the call flow, even though this position estimate may not be requested by the network. The network may elect to use the position estimate provided by the UE and bypass the location processing with the UE.

The position estimate for the target UE (e.g., sent in the SLREQ message, the LCS Location Notification Return Result message, and the LCS Services Invoke message) may be given in various formats. In an embodiment, a 2-dimensional (2D) position estimate includes a latitude and a longitude for the estimated position of the target UE. The latitude may be expressed with (1) a sign bit that indicates whether the estimated position is in the northern or southern hemisphere and (2) an encoded value $N_{lat}$ for the latitude $X_{lat}$ of the target UE, where $X_{lat}$ ranges from 0° to 90°. If 24 bits are available to represent latitude, then one bit may be used for the sign bit and 23 bits may be used for $N_{lat}$, which may be expressed as: $N_{lat} \leq (2^{23} \cdot X_{lat}/90) < (N_{lat}+1)$. The longitude may be expressed with an encoded value $N_{long}$ for the longitude $X_{long}$ of the target UE, where $X_{long}$ ranges from −180° to +180°. If 24 bits are available to represent longitude, then $N_{long}$ may be expressed as: $N_{long} \leq (2^{24} \cdot X_{long}/360) < (N_{long}+1)$. A 3-D position estimate includes a latitude, a longitude, and an altitude for the estimated position of the target UE. The altitude may be expressed with (1) a sign bit that indicates whether the estimated altitude is above or below a WGS84 (World Geodetic System 1984) ellipsoid and (2) the actual altitude (in meters) relative to the WGS84 ellipsoid.

A 2-D or 3-D position estimate also typically includes an uncertainty ellipse/ellipsoid and a confidence. The uncertainty ellipse indicates the uncertainty in the estimated 2-D position of the target UE. The uncertainty ellipse may be given by a latitude/longitude uncertainty code associated with the major axis of the ellipse, a latitude/longitude uncertainty code associated with the minor axis of the ellipse, and the orientation in degree of the major axis with respect to North.

The uncertainty code may be given by a formula that maps each uncertainty code value to a corresponding uncertainty in meters. The uncertainty ellipsoid indicates the uncertainty in the estimated 3-D position of the target UE. The confidence indicates the likelihood of the estimated position being within the uncertainty ellipse (for the 2-D estimated position) or the uncertainty ellipsoid (for the 3-D estimated position). The confidence may be expressed in percentage from 0 to 100. The various fields of the position estimate are described in further detail in a document 3GPP TS 23.032, which is publicly available.

Figure 6:
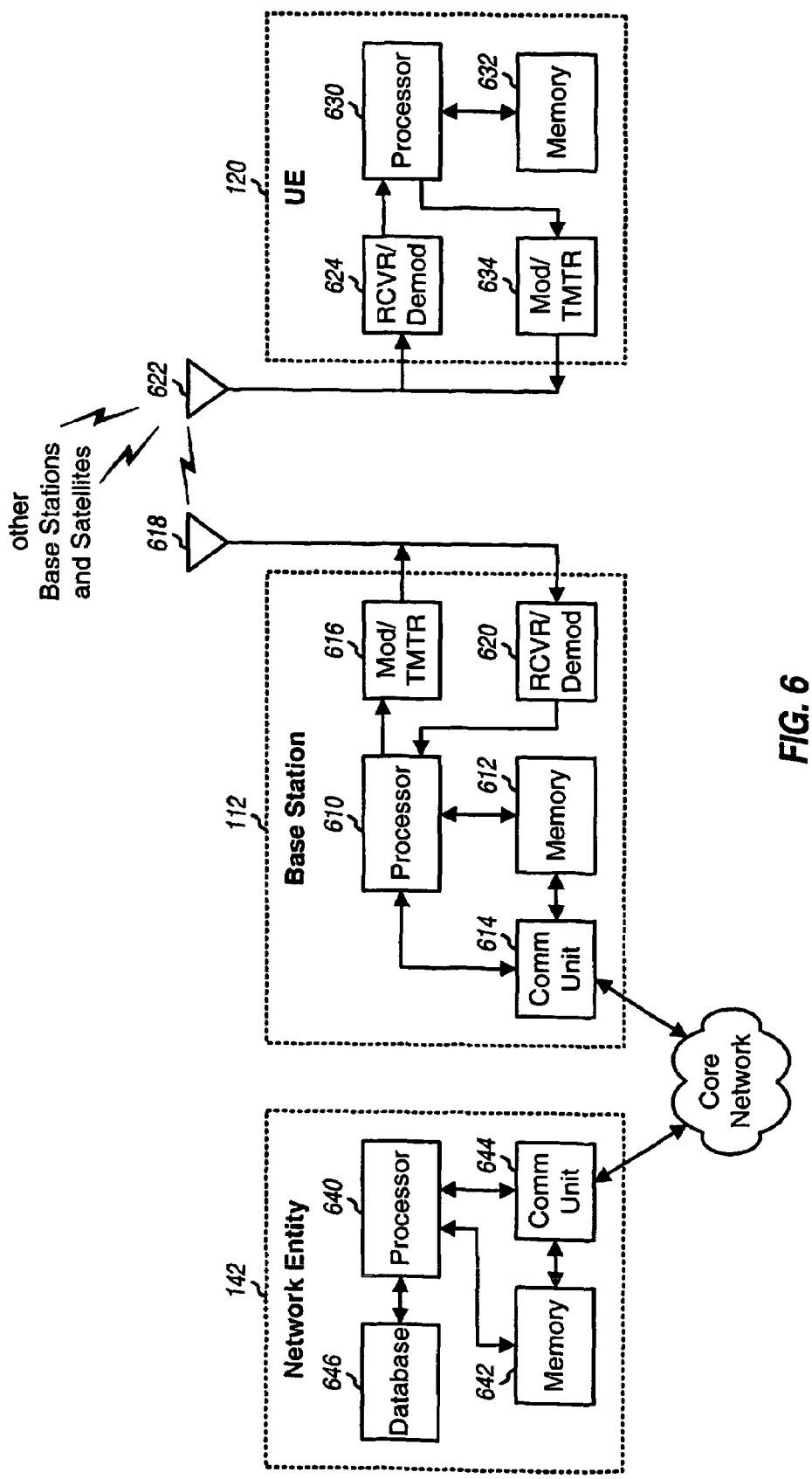
FIG. 6 shows a block diagram of various entities in the network in FIG. 1.

FIG. 6 shows a block diagram of various entities in network 100 in FIG. 1. UE 120 may be a cellular telephone, a user terminal, a computer with a wireless modem, a stand-alone position determination unit, or some other device. A base station 112 provides wireless communication for wireless network 110. For simplicity, only one network entity 142 is shown in FIG. 6. Network entity 142 may be any of the network entities shown in FIG. 1 (e.g., LCS client 130, LCS manager 140, or positioning server 150).

On the forward link, base station 112 transmits data, signaling, and pilot to the UEs within its coverage area. These various types of data are processed (e.g., encoded, modulated, filtered, amplified, quadrature modulated, and upconverted) by a modulator/transmitter (Mod/TMTR) 616 to generate a forward link modulated signal, which is transmitted via an antenna 618. At UE 120, an antenna 622 receives the forward link modulated signals from base station 112 and possibly other base stations and provides a receiver input signal to a receiver/demodulator (RCVR/Demod) 624. The receiver input signal may include received signals for base stations and possibly satellites. RCVR/Demod 624 processes the receiver input signal in a manner complementary to the processing performed by the transmitter(s) and provides various types of information that may be used for position determination. For example, RCVR/Demod 624 may provide the time of arrival of received signals (which may be used for position determination), decoded messages used for the call flows described above, and so on. A processor 630 performs processing for UE 120. A memory unit 632 stores program codes and data for processor 630.

On the reverse link, UE 120 may transmit data, signaling, and pilot to base station 112. These various types of data are processed by a modulator/transmitter (Mod/TMTR) 634 to generate a reverse link modulated signal, which is transmitted via antenna 622. At base station 112, antenna 618 receives the reverse link modulated signal from UE 120 and provides a receiver input signal to a receiver/demodulator (RCVR/Demod) 620. RCVR/Demod 620 processes the receiver input signal in a manner complementary to the processing performed by the UEs and provides various types of information to a processor 610. Processor 610 performs processing for base station 112. A memory unit 612 stores program codes and data for processor 610. A communication (Comm) unit 614 allows base station 112 to exchange data with other network entities.

Within network entity 142, a communication unit 644 allows network entity 142 to communicate with other network entities. A processor 640 performs processing for network entity 142. A memory unit 642 stores program codes and data for processor 640. A database 646 stores information pertinent for network entity 142 (e.g., subscriber information, location information, GPS assistance data, and so on).

The method and apparatus described herein may be implemented by various means. For example, the method and apparatus may be implemented in hardware, software, or a combination thereof. For a hardware implementation, the units used to perform the processing described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the method may be implemented with modules (e.g., procedures, functions, and so on) that perform the functions described herein. The software codes may be stored in a memory unit (e.g., memory unit 632 or 642 in FIG. 6) and executed by a processor (e.g., processor 630 or 640). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention is claimed is:

1. A method of performing position determination in a network, comprising:
   receiving from the network an indication to perform a position fix for a user equipment (UE);
   sending to the network an acknowledgment to perform the position fix;
   selectively sending to the network a position estimate for the UE;
   performing location processing with the network to obtain the position fix for the UE if the location processing is initiated by the network; and
   bypassing the location processing with the network if the position estimate is sent to the network and the location processing is not initiated by the network.

2. The method of claim 1, wherein the receiving from the network the indication to perform the position fix for the UE comprises
   receiving from the network a request for permission to perform the position fix for the UE.

3. The method of claim 1, wherein the selectively sending to the network the position estimate for the UE comprises
   sending the position estimate for the UE to the network without the position estimate being requested by the network.

4. The method of claim 1, wherein the selectively sending to the network the position estimate for the UE comprises
   sending the position estimate for the UE to the network if the position estimate is available at the UE.

5. The method of claim 1, wherein the selectively sending to the network the position estimate for the UE comprises
   sending the position estimate for the UE to the network if a UE-based positioning mode is allowed.

6. The method of claim 1, wherein the selectively sending to the network the position estimate for the UE comprises
   sending the position estimate for the UE to the network if the position estimate is derived without interaction with the network.

7. The method of claim 1, wherein the selectively sending to the network the position estimate for the UE comprises sending the position estimate for the UE to the network if an indication to perform an immediate position fix for the UE is received from the network.

8. The method of claim 1, wherein the performing location processing with the network comprises
performing the location processing in accordance with a UE-based positioning mode.

9. The method of claim 1, wherein the performing location processing with the network comprises
performing the location processing in accordance with a UE-assisted positioning mode.

10. The method of claim 1, wherein the position estimate for the UE comprises latitude and longitude information for the UE.

11. The method of claim 10, wherein the position estimate for the UE further comprises an uncertainty for the latitude and longitude information.

12. The method of claim 11, wherein the position estimate for the UE further comprises a confidence in the latitude and longitude information being within the uncertainty.

13. An apparatus comprising:
a receiver operative to receive from a network an indication to perform a position fix for a user equipment (UE);
a transmitter operative to send to the network an acknowledgment to perform the position fix and to selectively send to the network a position estimate for the UE; and
a processor operative to perform location processing with the network to obtain the position fix for the UE if the location processing is initiated by the network and to bypass the location processing with the network if the position estimate is sent to the network and the location processing is not initiated by the network.

14. The apparatus of claim 13, wherein the processor is operative to perform the location processing in accordance with a UE-based positioning mode or a UE-assisted positioning mode.

15. The apparatus of claim 13, wherein the processor is operative to send the position estimate for the UE to the network if the position estimate is available at the UE.

16. The apparatus of claim 13, wherein the position estimate for the UE comprises latitude and longitude information for the UE and an uncertainty for the latitude and longitude information.

17. An apparatus comprising:
means for receiving from a network an indication to perform a position fix for a user equipment (UE);
means for sending to the network an acknowledgment to perform the position fix;
means for selectively sending to the network a position estimate for the UE;
means for performing location processing with the network to obtain the position fix for the UE if the location processing is initiated by the network; and
means for bypassing the location processing with the network if the position estimate is sent to the network and the location processing is not initiated by the network.

18. The apparatus of claim 17, wherein the means for performing location processing with the network comprises
means for performing the location processing in accordance with a UE-based positioning mode or a UE-assisted positioning mode.

19. The apparatus of claim 17, further comprising:
means for sending the position estimate for the UE to the network if the position estimate is available at the UE.

20. The apparatus of claim 17, wherein the position estimate for the UE comprises latitude and longitude information for the UE and an uncertainty for the latitude and longitude information.

21. A method of performing position determination in a network, comprising:
sending to the network a request for transfer of a position estimate for a user equipment (UE) to a client entity;
selectively sending to the network a position estimate for the UE;
performing location processing with the network to obtain a position fix for the UE if the location processing is initiated by the network; and
bypassing the location processing with the network if the position estimate is sent to the network and the location processing is not initiated by the network.

22. The method of claim 21, wherein the selectively sending to the network the position estimate for the UE comprises
sending the position estimate for the UE to the network if the position estimate is available at the UE and without the position estimate being requested by the network.

23. A method of performing position determination in a network, comprising:
exchanging signaling with the network to initiate periodic location service for a user equipment (UE), the signaling including a schedule of location reporting events; and
for each location reporting event in the schedule,
selectively sending to the network a position estimate for the UE,
performing location processing with the network to obtain a position fix for the UE if the location processing is initiated by the network, and
bypassing the location processing with the network if the position estimate is sent to the network and the location processing is not initiated by the network.

24. The method of claim 23, further comprising:
performing location processing with the network to refresh location assistance data, as necessary.

25. The method of claim 23, wherein the exchanging signaling with the network to initiate periodic location service for the UE comprises
receiving from the network an indication to start periodic location service for the UE.

26. The method of claim 23, wherein the exchanging signaling with the network to initiate periodic location service for the UE comprises
sending to the network an indication to start periodic location service for the UE.

27. The method of claim 23, further comprising:
for each location reporting event in the schedule,
sending to the network a request for a location service, and wherein the position estimate for the UE is selectively sent along with the request for the location service.

28. The method of claim 27, wherein the selectively sending to the network the position estimate for the UE comprises
sending to the network the position estimate for the UE if the position estimate is available at the UE.

29. A method of performing position determination in a network, comprising:
sending to a user equipment (UE) an indication to perform a position fix for the UE;
receiving from the UE an acknowledgment to perform the position fix;
receiving a position estimate for the UE if sent by the UE;

performing location processing with the UE to obtain the position fix for the UE if the position estimate for the UE is not received; and using the position estimate for the UE and bypassing the location processing if the position estimate for the UE is received.

30. The method of claim 29, further comprising:

receiving from a client entity a request for the position fix for the UE; and providing the position estimate for the UE to the client entity.

31. The method of claim 29, wherein the performing location processing with the UE comprises initiating a location session between the UE and a network entity designated to support position determination for the UE, wherein the network entity and UE perform the position fix for the UE, and receiving from the network entity the position fix for the UE.

32. The method of claim 29, wherein the using the position estimate for the UE comprises determining whether the position estimate received from the UE meets at least one criterion, and using the position estimate if the at least one criterion is met.

33. The method of claim 29, wherein the using the position estimate for the UE comprises determining whether the position estimate received from the UE meets quality of service (QoS) requirements, and using the position estimate if the quality of service requirements are met.

34. An apparatus comprising:

a communication unit operative to send to a user equipment (UE) an indication to perform a position fix for the UE, to receive from the UE an acknowledgment to perform the position fix, and to receive a position estimate for the UE if sent by the UE; and a processor operative to perform location processing with the UE to obtain the position fix for the UE if the position estimate for the UE is not received and to use the position estimate for the UE and bypass the location processing if the position estimate for the UE is received.

35. The apparatus of claim 34, wherein the communication unit is further operative to receive from a client entity a request for the position fix for the UE and to send the position estimate for the UE to the client entity.

36. The apparatus of claim 34, wherein the processor is operative to initiate a location session between the UE and a network entity designated to support position determination for the UE in order to perform the position fix for the UE, and wherein the communication unit is operative to receive from the network entity the position fix for the UE.

37. The apparatus of claim 34, wherein the processor is operative to determine whether the position estimate received from the UE meets at least one criterion and to use the position estimate if the at least one criterion is met.

38. An apparatus comprising:

means for sending to a user equipment (UE) an indication to perform a position fix for the UE;

means for receiving from the UE an acknowledgment to perform the position fix;

means for receiving a position estimate for the UE if sent by the UE;

means for performing location processing with the UE to obtain the position fix for the UE if the position estimate for the UE is not received; and means for using the position estimate for the UE and bypassing the location processing if the position estimate for the UE is received.

39. The apparatus of claim 38, further comprising:

means for receiving from a client entity a request for the position fix for the UE; and means for providing the position estimate for the UE to the client entity.

40. The apparatus of claim 38, wherein the means for performing location processing with the UE comprises means for initiating a location session between the UE and a network entity designated to support position determination for the UE in order to perform the position fix for the UE, and means for receiving from the network entity the position fix for the UE.

41. The apparatus of claim 38, wherein the means for using the position estimate for the UE comprises means for determining whether the position estimate received from the UE meets at least one criterion, and means for using the position estimate if the at least one criterion is met.

\* \* \* \* \*